United States Patent [19]

Vezirian

[11] Patent Number: 4,819,517

[45] Date of Patent: Apr. 11, 1989

[54] SELECTED BEARING COUPLE FOR A ROCK BIT JOURNAL AND METHOD FOR MAKING SAME

[76] Inventor: Edward Vezirian, P.O. Box 2255, Vista, Calif. 92083

[21] Appl. No.: 215,050

[22] Filed: Jul. 5, 1988

[51] Int. Cl.⁴ .............................................. B21K 5/02
[52] U.S. Cl. .................................... 76/108 A; 384/92
[58] Field of Search ............. 76/108 R, 108 A, 101 R; 384/92, 95

[56] References Cited

U.S. PATENT DOCUMENTS

| | | | |
|---|---|---|---|
| 3,721,307 | 3/1973 | Mayo | 384/94 |
| 3,917,361 | 11/1975 | Murdoch | 384/92 |
| 3,990,751 | 11/1976 | Murdoch | 384/93 |
| 3,995,917 | 12/1976 | Quinlan | 384/95 |
| 4,744,270 | 5/1988 | Veziyian | 76/108 A |

Primary Examiner—Roscoe V. Parker

[57] ABSTRACT

A method of providing a selected bearing couple in a journal bearing of a rotary rock bit is described, wherein differential thermal expansion is used to mate a thin walled bushing of a chosen bearing alloy to one of the steel structural members. A pre-finished and pre-heat treated thin walled bushing is formed of the desired bearing alloy. Very little valuable space is required by the thin walled bushing. The use of arc-deposited metal, press fitting, or of loose parts is avoided, and many potential bearing alloys are adaptable as candidates for use in such a bushing.

2 Claims, 1 Drawing Sheet

SELECTED BEARING COUPLE FOR A ROCK BIT JOURNAL AND METHOD FOR MAKING SAME

BACKGROUND OF THE INVENTION

1. Field of the Invention

This invention pertains to the cantilevered journal friction bearings used to rotatively support the rock cutting cones of rotary rock bits. More specifically, this invention is directed to the methods of construction and assembly of such journal bearings.

2. Brief Summary of the Prior Art

Early examples or rotary rock bits used bearings formed of the parent metal of the journal shaft and of the rotating cone. Depending upon the skill of the manufacturer, some such bearings had flame hardened surfaces.

The continuing search for oil requires drilling ever deeper wells, demanding more of the rock bit and its' bearings. Hard facing metals, as first applied to the rock bit teeth, were later applied to the bearing surfaces of the journal shafts.

Many friction bearing designs are regarded as being used to bear loads predominantly or exclusively in one direction. The "unloaded" side is freely used to reservoir lubricant to produce the hydro-dynamic lubricant film which serves to separate the bearing surfaces on the "loaded side".

One such bearing is described in U.S. Pat. No. 3,995,917 by Quinlan. In production, most of the length of the radial bearing portion of the journal shaft is undercut in relief. Subsequently, the "loaded" side is filled with arc deposited hard facing metal, then ground to finished diameter. The unloaded side is left unfilled, providing a ready storage location for lubricant. The cooperating radial bearing portion of the bore of the rotary cutter is undercut in a similar manner and filled with arc deposited aluminum bronze and finish ground to size.

In a competing design, the unloaded side of the hardened journal shaft bearing area is relieved on the unloaded side for the storage of lubricant by means of an eccentric grinding operation. No hard facing material is added to this bearing.

Yet another popular design features a hard metal filled relief on the loaded side of the journal shaft, the shaft being then ground full round. The radial bearing portion of the cone bore is relieved over about half of its area, leaving axially oriented narrow lands of steel spaced apart by similarly shaped reliefs. The reliefs are filled with arc deposited soft bearing metal, and the bore is then ground to size. While the hard steel lands resist wear and support the load, the soft bars aid in load support and also serve to trap detritus by embedding.

Another bearing surface of similar nature but with a unique method of production has been patented in this country for use in a rock bit. The steel bearing surface is formed to near the finished diameter, deeply knurled, and subsequently over coated with a fused deposit of softer bearing alloy. The bearing is then ground to size, producing a surface of small work hardened diamond shaped areas of steel within a grid of soft bearing alloy.

Mayo, U.S. Pat. No. 3,721,307, describes a rock bit bearing using a floating bushing of beryllium copper running between hardened steel bearing surfaces of the journal and the cone bore. The bushing is about 0.125 thick thus occupying much valuable space. Because this design behaves like a bearing within a bearing, the running clearances are effectually doubled. Both the inner and the outer bearing run beryllium copper against hardened steel, a bearing couple of known advantage.

Murdoch, U.S. Pat. No. 3,917,361, teaches the use of a thin, split, floating, flexible bushing in a rock bit journal. Beryllium copper is specified as preferred, providing the same couple as Mayo. The split ring compensates for thermal changes in its own diameter providing for closer running clearances.

Murdoch, U.S. Pat. No. 3,990,751, uses a floating bushing of maraging steel, for high strength and toughness, plated with 0.001 inch of silver for a desired bearing couple in unison with the hard steel of the cone and the journal.

A commercial variation on the floating bushing uses a similar bushing being force fit into the cone bore. The running clearance is normal. The bushing is thick to withstand the assembly and running loads, and the danger of metal chips caused by shearing during the pressing operation is noted. One such bearing is described by Mayo et al, U.S. Pat. No. 4,293,167.

Rock bits typically are used until some part fails. Ideally, the bearings should hold up until the cutting teeth wear out, and the bit may then be withdrawn without leaving metal parts in the well bore. Bearings, and/or their grease seals, generally fail first, sometimes resulting in the down hole loss of rotary cones. A need exists, therefore, for further improvement in the bearing systems of rock bits aimed at lengthening the reliable life expectancy of such bearings in service. Many bearing couples are superior to the heat-treated steels of cone and journal running against each other, however, providing alternate metals generally involves compromising some other desired features; structure, strength/space, or running clearance.

The production of fine finishes and close running fits are important considerations in service longevity, not well supported by such practices as relieving the unloaded side of the journal shaft bearing, or by the use of a floating bushing which also serves to double the running clearances. A bushing of any type gives a wider choice of materials with which to produce a long running bearing couple, but bushings also use up premium radial space which is a contraindication to their use in rock bits.

Another important area for improvement is in the nature of materials used in the construction of such bearings. Materials which are arc deposited are less than ideal choices being metallurgically non-homogeneous and of disordered microstructure.

SUMMARY OF THE INVENTION

An object of this invention is to provide an improved friction bearing couple between two relatively moving and mutually cooperating load bearing structural steel members using minimum running clearances.

Another object of this invention is to provide a heavy duty friction bearing couple using only sound wrought, cast or forged materials.

Yet another object of this invention is to provide a heavy duty friction bearing wherein each component receives an independent heat treatment.

In a friction bearing, a bearing in which one member slides under load upon a second member, it is known to be advantageous to make the members of dissimilar materials and of unequal hardness.

In the interest of structural strength, at least one of the metals is commonly steel, preferably hardened steel, or perhaps the parent steel with a specially treated surface. Many other metals, or combinations of metals, are commonly used in conjunction with steel to form a bearing "couple".

Beryllium copper and beryllium nickel, which are precipitation hardening alloys, run particularly well as bearings against hardened steel, and may be hard in themselves. In use, Beryllium nickel may be as hard or harder than its steel counterpart. Even when fully soft these alloys have very great resistance to wear, in bearing use, due to a tough oxide film that naturally forms on the alloy surface.

Both the journal shaft and the rotary cone of a typical rock bit are of heat treated steel. In the practice of this invention, a thin, pre-finished and pre-heat treated, bushing is thermally mated by differential expansion to one steel member. In this way the desired bearing couple is provided without introducing loose or unsupported member, complicating heat treat procedures, or involving welding or brazing. Typically, about 0.002 inch to 0.003 inch of "interference fit" is provided per inch of bearing diameter by the thermal fitting process. If installed in the cone bore, the bushing is held under substantial compression. Installed on the journal shaft, the bushing is held in considerable tension. Being supported over its entire area by the steel member, the finished bushing need be no thicker than required for accuracy and convenience in production. It should be noted that very little of the bearing surface wears away prior to bearing failure, thus wear is not a consideration in determining bushing thickness.

In a rotary cone rock bit having a structural body supporting at least one downwardly and inwardly extending load bearing journal shaft, the journal shaft rotatively supporting a rock cutting cone, a method is provided to select a bearing couple at the rotary interface of the rock cutting cone with the load bearing journal.

This invention concerns a method to provide a rotary rock bit journal bearing with a selected bearing couple, consisting of the following steps:

1. Choosing a material for the bearing couple.
2. Pre-forming a thin walled bushing to near net shape from the chosen material.
3. Heat treating the bushing if required.
4. Finishing the bushing to size, providing for an interference fit with the bore of the rock cutter cone, or with the radial bearing area of the load bearing journal shaft, so that a bearing surface is presented by the bushing which is dissimilar to that presented by the parent material of the member so bushed.
5. Providing a high heat capacity fixture to emulate the mating member, that is, the unbushed member.
6. Fixturing the bushing in the fixture.
7. Establishing a predetermined temperature differential between the fixture-bushing combination and the member to be bushed.
8. Assembling the fixtured bushing to the rock bit member to be bushed.
9. Allowing the differential temperatures to equalize.
10. Removing the fixture from the assembly.
11. Assembling the rock cutting cone with the load bearing journal shaft.

The above described method of production provides for the choice of bearing surface or surfaces within the journal bearing of a rock bit. The use of this method enables the use of bearing couple combinations found otherwise impractical. Stellite, for example, is arc-deposited on the shaft member of rock bits. This material, like a number of others, is too prone to brittle fracture to permit its use in the cone member where normal flexure could not be tollerated. This material could be provided as a wrought thin ring, finish ground, and thermally installed in the cone member. This bushing can be made thin enough to withstand the flexure of the cone, and being held in compression by the cone, tensile fracture is not a threat. Thin bushings can be made of materials which complete bearing couples having low friction, lubricity, high wear resistance, embedability, corrosion resistance, or surface conformity.

A rotary cone rock bit as addressed in this application, consists of a structural body supporting at least one downwardly and inwardly extending load bearing journal shaft, such journal shaft rotatively supporting a rock cutting cone, and means to axially retain said rock cutting cone on said load bearing journal shaft. In the practice of this invention each such cone and journal combination further includes at least one thin walled bearing bushing which is thermally interference fitted to a bore formed within said rock cutter cone, or to the radial bearing portion of the load bearing journal shaft, to present a bearing surface being dissimilar to the parent material of the member to which attached. Of course, both the rotary cone and the journal could be bushed to provide a dual choice of surfaces in the bearing couple.

An advantage of this invention is the expansion of choices of material and choices of condition of material for use in a rotary rock bit journal bearing to achieve an advantaged bearing couple for a longer useful bit life.

The features of the present invention, which are believed to be novel, are set forth with particularity in the appended claims. The present invention, both as to its organization and its manner of operation, together with the further advantages thereof, may best be understood by reference to the following description taken in connection with the accompanying drawings.

DESCRIPTION OF THE PREFERRED EMBODIMENTS

Figure 1:
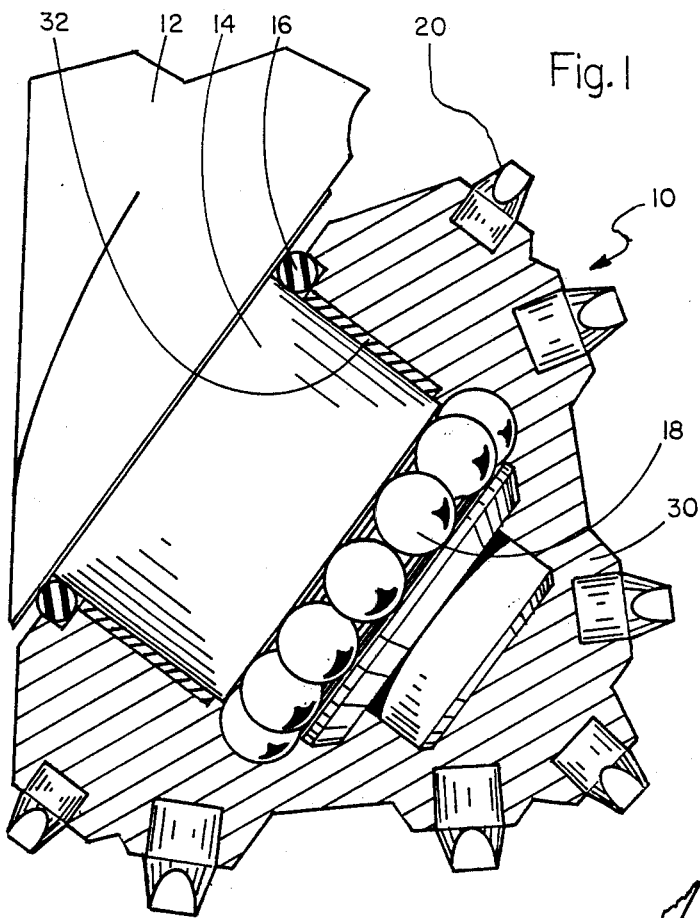
FIG. 1 depicts a typical rotary rock bit journal and cone assembly broken away from the rest of the rock bit. The rotary cone and its associated thermally interference fitted bearing bushing are shown in cross-section.

A rotary rock bit has at least one conical cutter which is rotatively supported by a cantilevered journal which extends downwardly and inwardly from the structural body of the bit. One such cantilevered journal and cutter cone assembly is depicted in FIG. 1 as broken away from the rest of the bit, and is generally indicated as 10. The cantilevered journal 14 is supported by an extension 12 of the structural body (not shown). A rotary cutter cone 30, rotatively supported by journal 14, in turn supports rock cutting hard metal teeth 20. Cutter cone 30 is axially retained on journal 14 by bearing balls 18 which are entrained between cone ball race 42 (see FIG. 2), and journal ball race 58 (see FIG. 3). A bearing bushing 32 is thermally fitted in a bore formed within cutter cone 30. Bearing bushing 32 is of a metal selected to provide desired bearing characteristics when coupled with the metal surface of journal 14. Seal ring 16, housed in seal gland 34 (see FIG. 2) serves to retain lubricant within the journal bearing space, and to exclude environmental detritus.

Figure 2:
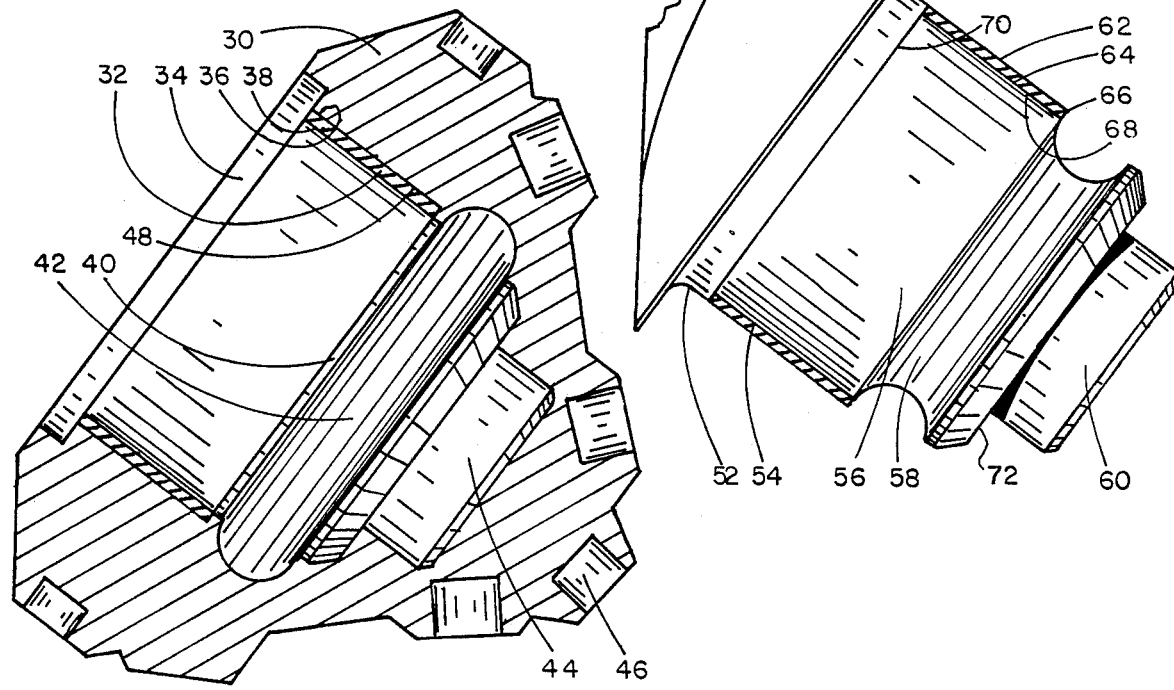
FIG. 2 is a cross-sectional view of the cone and bushing sub-assembly of FIG. 1.

FIG. 2 is a cross-sectional view of cutter cone 30 and bearing bushing 32 as a sub-assembly. Bore 48 formed within cutter cone 30 has a diameter slightly smaller than the diameter provided the outside 36 of bearing bushing 32. By differentially controlling the temperatures of cone 30 and bearing bushing 32, cone bore 48 is made sufficiently larger than outside diameter 36 of bearing bushing 32 to permit manual assembly of bushing 32 into bore 48.

If the bushing is beryllium copper, then it has very high thermal conductivity. The thermal capacity of beryllium copper is also very high, but the mass of the thin walled bushing is very small. There is an attendant danger in assembling the bearing bushing 32 into the bore 48 of the cone 30 that the temperatures of the two parts would equalize to quickly to accomplish the assembly, thus ruining both parts. Therefore, a fixture is provided which physically emulates the journal in part, and is of a material similar to the bushing. In use this fixture holds the bushing round and straight, and constitutes a large heat sink to keep the bushing cool enough long enough to accomplish the assembly operation. When the temperatures equalize, then bushing 32 becomes securely fixed within bore 48 of cutter cone 30. Bearing surface 38 of bearing bushing 32 provides the desired member of the bearing couple sought to run upon the bearing surface presented by the journal.

Notice that the cone bore 48 does not extend all the way to the cone ball race 42. In the event of some force tending to pull cone 30 from journal 14, then retention balls 18 impinge the lip of ball race 42 nearest to bushing 32. As illustrated, that ball race lip is left intact to support the retention balls.

Figure 3:
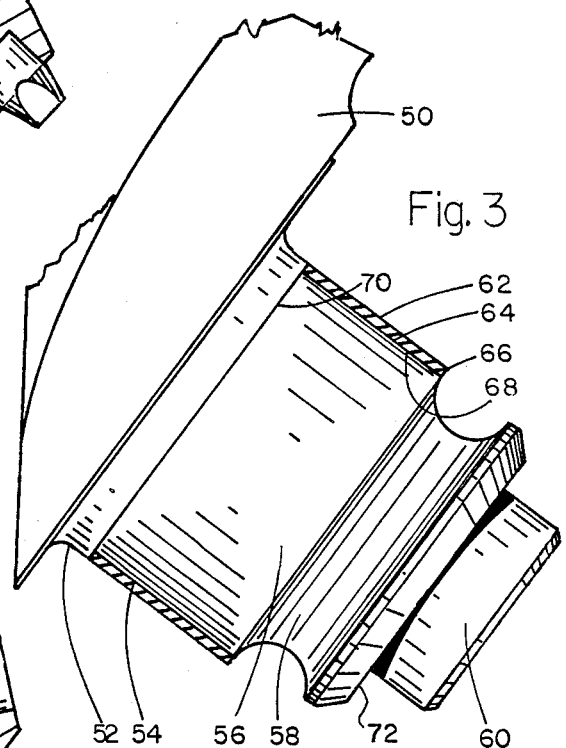
FIG. 3 illustrates another embodiment of the invention wherein the bearing bushing is thermally fitted to a journal of a rotary rock bit. As in the FIG. 1, the journal is shown broken away from the rest of the rock bit.

Pilot bore 44 is provided to accommodate pilot pin 60 (see FIG. 3). Although not shown here, Pilot bore 44 could also be bushed if desired. Precision bores 46 are provided to house the tungsten carbide inserts 20.

FIG. 3 illustrates another embodiment of the invention, in which the journal is bushed. These embodiments are not mutually exclusive, as both could be used in the same rock bit. A downwardly extension 50 of structural support body (not shown) of a rock bit supports journal 56 in turn. Journal ball race 58 is provided to house retainer balls 18, and pilot pin 60 serves to resist cocking of cone on journal. Seal surface 50 supports seal ring 16 to retain grease and exclude external detritus. As illustrated bearing bushing 54 does not extend into seal surface 50, stopping instead against shoulder 70. It is considered to be supportive of the seal integrity to terminate the bushing within the sealed area, however it is an option. The outside surface 64 of journal 56 is formed slightly larger than the finished inside diameter 68 of bearing bushing 54 to provide an interference fit for bearing bushing 54 upon journal 56. Bearing bushing 54 extends all the way to journal ball race 58. Edge 66 of bearing bushing 54 thus constitutes the lip of journal ball race 58, which is always an unloaded lip. Thrust loads in that direction are carried by primary thrust face 72.

For assembly of bearing bushing 54 onto journal 56 a fixture emulating a cone in part is used. This fixture aids in handling of bearing bushing 54, and keeps bearing bushing 54 hot enough long enough to accomplish the assembly.

The choices of materials for use in the bearing bushing are varied. Materials may be very hard, soft and embedable, lubricious, tough, gall resistant, weld resistant, wear resistant, or corrosion resistant, alone or in combination.

The thin bushing is a more convenient form to handle in manufacture than is the entire rock cutting cone or the journal shaft member.

Although certain preferred embodiments of the present invention have been herein described and illustrated in order to provide an understanding of the general principles of the invention, it will be appreciated that various changes and innovations can be effected in the described drill bit structure of method of producing same without departure from these principles. Thus all modifications and changes of this type are deemed to be embraced by the spirit and scope of the invention except as the same may be necessarily limited by the appended claims or reasonable equivalents thereof.

I claim:

1. A method to provide a preselected bearing couple at a rotary interface of a rock cutting cone with a load bearing journal in a rotary cone rock bit comprised of steps;

choosing a material for said bearing couple, forming a thin walled bushing to near net shape from said material, heat treating said bushing as required, finish forming said bushing, providing for an interference fit with a bore formed within said rock cutting cone, providing a high heat capacity fixture, said fixture to emulate said load bearing journal shaft, fixturing said bushing on said fixture, establishing a predetermined temperature differential between said rock cutting cone and said fixture with said bushing attached, assembling said fixtured bushing to said rock cutting cone, allowing said differential temperatures to equalize, removing said fixture from assembly, assembling said load bearing journal shaft to said rock cutting cone, said rock cutting cone having said bearing bushing installed therewithin.

2. A method to provide a preselected bearing couple at a rotary interface of a rock cutting cone with a load bearing journal in a rotary cone rock bit comprised of steps;

choosing a material for said bearing couple, forming a thin walled bushing to near net shape from said material, heat treating said bushing as required, finish forming said bushing, providing for an interference fit with said load bearing journal shaft, providing a high heat capacity fixture, said fixture to emulate said rock cutting cone, fixturing said bushing within said fixture, establishing a predetermined temperature differential between said load bearing journal shaft and said fixture with said bushing installed, assembling said fixtured bushing to said load bearing journal shaft, allowing said differential temperatures to equalize, removing said fixture from assembly, assembling said rock cutter cone to said load bearing journal shaft with said bushing installed.

* * * * *